United States Patent [19]

Takuma et al.

[11] Patent Number: 5,002,925

[45] Date of Patent: Mar. 26, 1991

[54] ISOPROPYL 1-AMINO-4-M-TOLUIDINOANTHRAQUINONE-2-CARBOXYLATE, CYAN COMPOSITION FOR SUBLIMATION TRANSFER RECORD AND CYAN COMPOSITION FOR COLOR TONER CONTAINING IT

[75] Inventors: Keisuke Takuma; Tsukasa Ohyama; Akitoshi Igata; Tamio Mikoda, all of Ohmuta; Isamu Ghoda, Kobe; Hitoshi Koshida, Nishinomiya, all of Japan

[73] Assignee: Mitsui Toatsu Chemicals, Incorporated, Tokyo, Japan

[21] Appl. No.: 337,859

[22] Filed: Apr. 14, 1989

[30] Foreign Application Priority Data

Apr. 14, 1988 [JP] Japan .................................. 63-90170

[51] Int. Cl.$^5$ ............................................ B41M 5/035
[52] U.S. Cl. ........................................ 503/227; 8/471; 430/110
[58] Field of Search ........................ 430/110, 126, 104; 428/207; 503/227; 8/471

[56] References Cited

U.S. PATENT DOCUMENTS 4,145,300 3/1979 Hendriks .............................. 430/110
4,857,503 8/1989 Jongewaard et al. .............. 428/207

Primary Examiner—John Goodrow
Attorney, Agent, or Firm—Millen, White & Zelano

[57] ABSTRACT

Disclosed are a novel compound represented by the formula

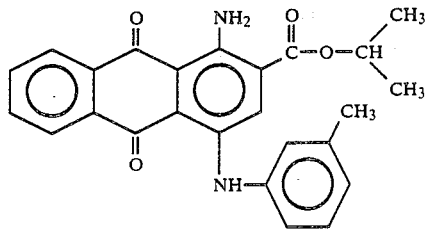

a composition for sublimation transfer record containing the above-mentioned compound, and a composition for color toner containing the above-mentioned compound.

7 Claims, 2 Drawing Sheets

ISOPROPYL 1-AMINO-4-M-TOLUIDINOANTHRAQUINONE-2-CARBOXYLATE, CYAN COMPOSITION FOR SUBLIMATION TRANSFER RECORD AND CYAN COMPOSITION FOR COLOR TONER CONTAINING IT

BACKGROUND OF THE INVENTION

1. Field of the Invention

The present invention relates to a novel compound, a composition for sublimation transfer record and a composition for color toner containing this compound as a cyan dyestuff.

For hard copies of full color images, a variety of systems has been now suggested and put into practice. Above all, a new system, is a thermosensitive sublimation transfer system. Much attention is paid to the new system in which a transfer density can be altered in a analog state by controlling the quantity of heat from a heating head, because this system is relatively simple and can provide very sharp images.

Furthermore, of the hard copy techniques, an electrophotographic system is most prevalent and lately copiers for which a color toner is used to provide full color images have been put on the market. In this kind of copiers, the sharp multicolor images can be obtained by exposing an orginal through a color separation filter, and then separately superimposing yellow, magenta and cyan color toners.

2. Description of the Related Art

Heretofore, a 1-aminoanthraquinone-2-carboxylate derivative dyestuff represented by the formula (II)

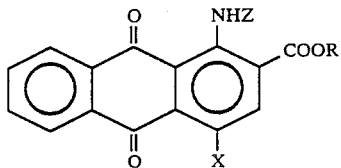

wherein R is an alkyl group, X is a hydroxyl group or amino group which may be substituted, Z is a hydrogen atom or alkyl group, is known as a disperse dye (Japanese Pat. Publication No. 14315/1965), and this type of dyestuff is applied to a dyestuff for sublimation transfer record having the formula (III)

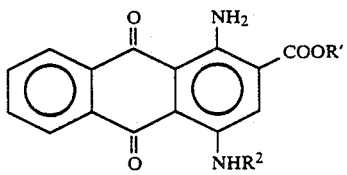

wherein R' is a benzyl group or a cyclohexyl group and $R^2$ is an alkyl group, an aralkyl group, an aryl group or the like (Japanese Pat. Laid-open Publication No. 288656/1987).

The present inventors have found that when X or $NHR^2$ in the general formula (II) or (III) is replaced with an anilino group, a dyestuff with a satisfactory hue for sublimation transfer record purposes can be obtained, and preservation stability and light resistance can be improved.

However, it has been also found that transfer sensitivity of this type of dyestuff, which is one of the most important characteristics depends largely upon a kind and a combination of substituents, e.g., the ester portion and the anilino group in, for example, a compound of the general the formula (IV)

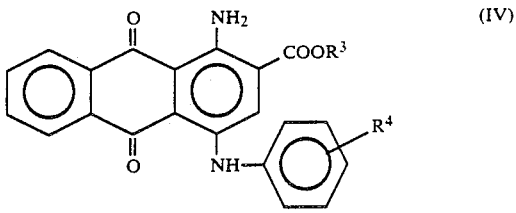

as well as the position of the substituent.

In Japanese Pat. Laid-open Publication No. 288656/1987, the combination of groups is improper to obtain a satisfactory effect, and thus some improvement is needed.

In general, the color toner is required to have various physical and chemical properties. However, most of the known color toners have some of the following drawbacks, and hence improvements are needed.

(1) The frictional electricity properties of the color toners are inversely affected by temperature change.

(2) When continuously used and repeatedly developed, color toner particles collide with carrier particles, and these particles and the photosensitive plate to which they attach themselves deteriorate mutually. Consequently, a change in color density takes place or the density of the background heightens, which impairs the quality of the copies produced therefrom.

(3) When the amount of the color toner on the surface of a photosensitive plate having a latent image is increased, with the intention of heightening the density of a copy image, the background density usually also rises, with the result that the so-called fog phenomenon occurs.

(4) Since they are superimposed one on another, the color toners have excellent in transparency. With regard to the conventional color toners, however, the transparency is poor.

(5) The melt miscibility of the conventional toners is insufficient.

(6) Spectral reflectance properties necessary to precisely reproduce an original are poor.

SUMMARY OF THE INVENTION

An object of the present invention is to provide a novel dyestuff for sublimation transfer having high transfer sensitivity and solubility, a novel composition for sublimation transfer record containing the dyestuff, and a novel composition for color toner containing the dyestuff.

The present inventors have found that a compound of the general formula (II) has remarkably high sublimation transfer sensitivity and is excellent as a sublimation transfer dyestuff only when in the R is an isopropyl and X is m-toluidino.

Furthermore, it has been also found by the present inventors that the compound represented by the formula (I), when used as a dyestuff for color toner, is excellent in melt miscibility, provides stable cyan image density, even when images are continuously copied by the repetition of development, and is excellent in light-fastness.

An aspect of the present invention is directed to a novel compound represented by the formula (I)

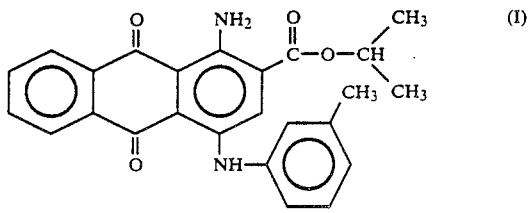

The other aspects of the present inventon are directed to a composition for sublimation transfer record containing the above-mentioned compound as a dyestuff and a composition for color toner containing the above-mentioned compound as a dyestuff.

In the formula (I), in contrast to o-toluidino and p-toluidino groups, the m-toluidino group has the effect of inhibiting the crystallization of the molecule to thereby prevent its melting point from increasing. This effect can be heightened by combining the group with an isopropyl ester. Therefore, the solubility and miscibility of the new compound in a resin are also heightened. With regard to the dyestuff for sublimation transfer record, it is usually believed that the higher the transfer sensitivity is, the lower the preservation stability of a ribbon is. However, the new compound of the present invention having the formula (I) is also excellent in preservation stability.

The dyestuff of the present invention is a good cyan dyestuff, it has high transfer velocity and is resistant to heat, light, humidity, chemicals and the like, and therefore the dyestuff does not decompose during transfer recording. In addition, records obtained by using this dyestuff are also excellent in preservability.

In particular, the dyestuff of the present invention is excellent in solubility in an organic solvent, and therefore it can be used to prepare a uniformly dissolved and concentrated ink, which permits obtaining records having good color density.

The color toner composition of the present invention can be used successfully as a color toner for electrophotography.

A conventional toner has problems such as the poor light resistance of copies thereof, the occurrence of a fog phenomenon and low melt miscibility. However, the composition for toner of the present invention has excellent melt miscibility, and images continuously copied by the repeated development of the toner composition have a stable cyan color and high light-fastness. Consequently, the composition for toner of the present invention is commercially very valuable.

Figure 2:
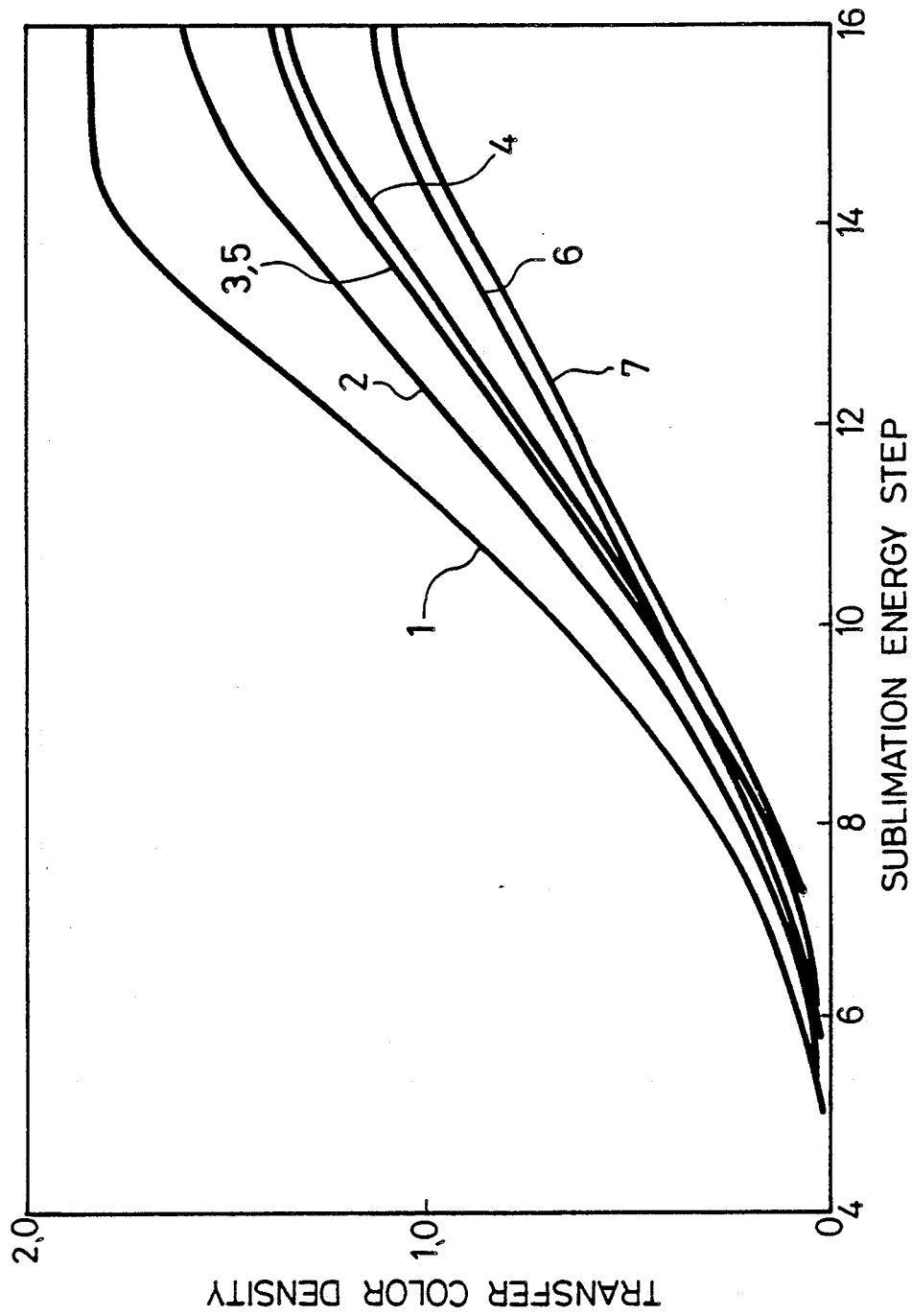
FIG. 2 shows a relation between transfer color density and the amount of energy applied at the time of sublimation transfer, the amount of energy being divided into 16 steps. In a certain energy step at the sublimation transfer, the greater the transfer color density, the better the transfer sensitivity.

The numerals in FIG. 2 have the following meanings:
1 ... A curve for a compound prepared in Example 2
2 ... A curve for a composition prepared in Comparative Example 1
3 ... A curve for a composition prepared in Comparative Example 2
4 ... A curve for a composition prepared in Comparative Example 3
5 ... A curve for a composition prepared in Comparative Example 4
6 ... A curve for a composition prepared in Comparative Example 5
7 ... A curve for a composition prepared in Comparative Example 6

DETAILED DESCRIPTION OF THE INVENTION

The novel compound of the present invention has not been can be prepared, for example, according the following reaction route.

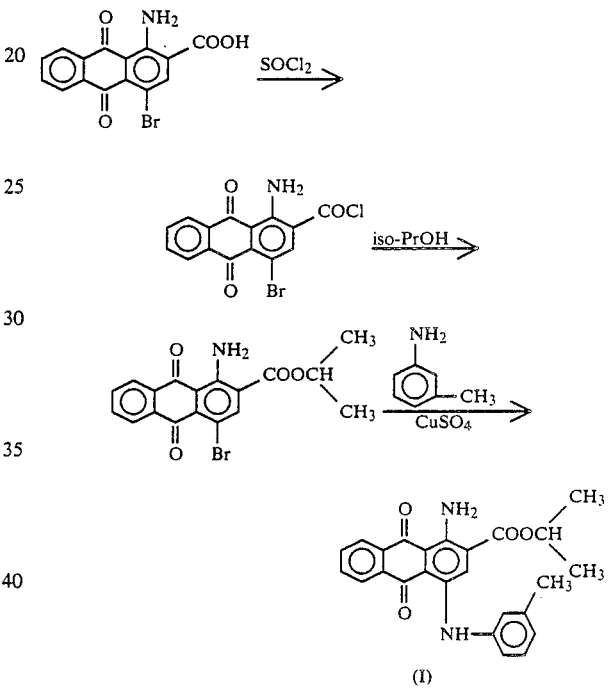

The starting 1-amino-4-bromoanthraquinone-2-carboxylic acid is reacted with 1.5 to 3 molar equivalents of a chlorinating agent such as thionyl chloride at a temperature of 80 to 100° C. for a period of about 1 to 3 hours in the presence of 0.01 to 5 molar equivalents (based on the raw material) of pyridine in 3 to 7-fold weight an amount of an inert solvent such as orthodichlorobenzene, chlorobenzene, toluene or xylene so as to be converted into an acid chloride. After the excess chlorinating agent has been removed therefrom under reduced pressure, 1.5 to 5 molar equivalents of isopropyl alcohol is added thereto and esterification is then performed at 60 to 80° C. for 1 to 3 hours. Afterward, the product is allowed to stand, thereby obtaining crystals of isopropyl 1-amino-4-bromoanthraquinone-2-carboxylate.

Next, the thus obtained ester is reacted with 1 to 10molar equivalents of m-toluidine in 0.1 to 3-fold weight amount of a solvent such as ethylcellosolve, dipropylene glycol or sulfolane or without any solvent in the presence of 0.01 to 0.5molar equivalents of a copper salt such as copper sulfate, copper acetate, copper chloride or copper oxide or metallic copper and 1 to 3-fold moles of a base such as sodium acetate, potassium acetate, sodium carbonate or potassium carbonate under a nitrogen atmosphere to prepare isopropyl 1-amino-4-m-toluidinoanthraquinone-2-carboxylate.

Reaction temperature depends upon the kind of solvent employed, but usually it is in the range of 100 to 180° C., preferably 130 to 150° C., and reaction time is in the range of 1 to 5 hours. When about 0.1 to 0.5 molar equivalents of benzyl alcohol is added thereto, the reaction can proceed more rapidly. For the purpose of isolating the desired compound from the thus obtained reaction mixture, the mixture is introduced into methanol, and the solution then stirred sufficiently and filtered.

A composition for sublimation transfer record containing the dyestuff comprising the compound of the present invention may be prepared by mixing the dyestuff with a suitable resin, solvent and the like. Furthermore, the sublimation transfer of the dyestuff may be achieved in the following manner: First, a suitable substrate is coated with the above obtained composition for sublimation transfer to prepare a transfer sheet, the latter is then superimposed on a material to be recorded, and heat and pressure are applied to the back surface of the sheet by the use of a thermosensitive recording head, whereby the dyestuff on the sheet is transferred to the material to be recorded.

The resin used to prepare the composition for sublimation transfer record is what is employed in a usual printing ink, and examples of which include oily resins such as rosins, phenol resin, xylene resin, petroleum resin, vinyl resin, polyamide resin, alkyd resin, nitrocelluloses and alkylcelluloses, and aqueous resins such as maleic resin, acrylic resin, casein, shellac and glue.

Examples of the solvent used to prepare this composition include alcohols such as methanol, ethanol, propanol, butanol; cellosolves such as methyl cellosolve and ethyl cellosolve; aromatics such as bezene, toluene and xylene; esters such as ethyl acetate and butyl acetate; ketones such as acetone, methyl ethyl ketone and cyclohexanone; hydrocarbons such as ligroin, cyclohexane and kerosine; and dimethylformamide. When an aqueous resin is used, the solvent may be water or a mixture of water and any of the above-mentioned solvents.

The content of the dyestuff in the composition for sublimation transfer record is in the range of 1 to 10% by weight based on the total weight of the composition when that the dyestuff is dissolved therein, and in the range of 1 to 50% by weight based on the total weight of the composition when the dyestuff is dispersed therein.

Suitable examples of the substrate which is coated with the above-mentioned composition include thin papers such as condenser paper and glassine paper; and plastic films having high heat resistance such as polyester, polyamide and polyimide. The thickness of the substrate is suitably in the range of 5 to 50 μm in order that the transfer efficiency of heat from the thermosensitive recording head to the dyestuff is heightened.

Examples of the material to be recorded include fibers, fabrics, films, sheets and molded articles comprising polyolefin resins such as polyethylene and polypropylene; halogenated polymers such as polyvinyl chloride and polyvinylidene chloride; vinyl polymers such as polyvinyl alcohol, polyvinyl acetate and polyacrylate; polyester resins such as polyethylene terephthalate and polybutylene terephthalate; polystyrene resins; polyamide resins; copolymer resins of a vinyl monomer and olefins such as ethylene and propylene; cellulose resins such as ionomer, cellulose diacetate and cellulose triacetate; polycarbonate; polysulfone and polyimide.

The particularly preferred material to be recorded is a fabric, sheet or film comprising polyethylene terephthalate.

In order to obtain good records which are excellent in image stability under conditions of high temperature and high humidity, the other specific materials to be recorded can be used. Examples of such materials to be recorded can include ordinary papers coated and impregnated with the above-mentioned resin containing acidic particles of silica gel or the like, laminates of the resins, and especial treated papers which have been subjected to acetylation. In addition, synthetic papers made from various resins can be also used as the material to be recorded.

After the transfer recording, for example, a polyester film may be thermally pressed on the surface of the transfer record to form a laminate. When such a treatment is made, the color development of the dyestuff can be improved and the preservation of the records can be stabilized.

A color toner composition of the present invention can be prepared by mixing 0.1 to 10% by weight of the compound represented by the formula (I) with a binding resin.

Detailed reference will now be made to constitutional components of the composition for color toner.

The particularly important constitutional component of this composition is the anthraquinone compound of formula (I). This anthraquinone compound is contained in the binding resin and provides the toner with excellent charge properties. Furthermore, the compound of formula (I) assumes a greenish cyan color and is used as a coloring dyestuff for the cyan toner singly or together with another dyestuff. The amount of the cyan dyestuff for color toner depends upon the charge properties of the binding resin, an auxiliary colorant or additives, the miscibility of the dyestuff with the binding resin and the procedure of dyestuff dispersion. Nevertheless, the dyestuff is preferably used in an amount of about 0.1 to 10% by weight based on the binding resin.

Examples of the binding resin suitable for the composition for color toner of the present invention include homopolymers of styrene and substituted styrenes such as polystyrene, poly(P-chlorostyrene) and polyvinyltoluene; styrene copolymers such as styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-vinyl methyl ether copolymer, styrenevinyl ethyl ether copolymer, styrene vinyl methyl ketone copolymer, styrene-butadiene copolymer, styrene-isoprene copolymer, styrene-acrylonitrile-indene copolymer, styrene-maleic acid copolymer and styrene-maleate copolymer; poly(methyl methacrylate), poly(butyl methacrylate), polyvinyl chloride, polyvinyl acetate, polyethylene, polypropylene, polyester, polyurethane, polyamide, polyvinyl butyral, polyacrylic resin, rosin, modified rosins, terpene resin, phenolic resin, aliphatic and alicyclic hydrocarbon resins, aromatic petroleum resin, chlorinated paraffins and paraffin wax.

One of the important characteristics of the toner is charge properties, and for the purpose of obtaining the charge properties, a charge regulator is used. Typical examples of the charge regulator include an N-alkylpyridinium compound such as N-cetylpyridinium chloride, a quaternary ammonium salt such as octadecylammonium chloride, and a metallic complex such as bis(4-t-butylsalicylic acid) chromium (II).

A carrier is used in a developing agent, and examples of the carrier include magnetic materials such as iron, cobalt and nickel, alloys and mixture thereof, and coated materials thereof.

The present invention will now be described in reference to examples and comparative examples.

EXAMPLE 1

While a solution of 100 parts of 1-amino-4-bromoanthraquinone-2-carboxylic acid, 1.6 parts of pyridine and 500 parts of orthodichlorobenzene was stirred at room temperature, 87 parts of thionyl chloride was added thereto dropwise over about 30 minutes. After the completion of the addition, the solution was heated at 100° C. for 2 hours. Afterward, excess thionyl chloride was distilled off under reduced pressure, and 88 parts of isopropyl alcohol was added dropwise to the solution at about 80° C. Reaction was performed at the same temperature as above for 2 hours, and the solution was then cooled to room temperature. Afterward, the solution was introduced into 1,000 parts of methanol, followed by stirring for 30 minutes. The resulting precipitate was collected by filtration, washed with methanol and dried, thereby obtaining 90 parts of isopropyl 1-amino-4-bromoanthraquinone-2-carboxylate. To the thus obtained product were added 34 parts of potassium acetate, 3 parts of copper sulfate, 6 parts of benzyl alcohol, 59 parts of m-toludine and 206 parts of dipropylene glycol, and the solution was then heated u to 135° C. in a nitrogen atmosphere and reaction was carried out for 2.5 hours. Afterward, the solution was cooled to 50° C. and was then introduced into 2,000 parts of methanol, followed by enough stirring for 30 minutes. The resulting precipitate was then collected by filtration, introduced into 2,000 parts of methanol again, stirred, filtered, and dried, so that 89 parts of isopropyl 1-amino-4-m-toluidinoanthraquinone-2-carboxylate (melting point 133–134° C.) was obtained.

|  | C | H | N |
|---|---|---|---|
| Calculated values (%) | 72.46 | 5.31 | 6.76 |
| Found values (%) | 72.32 | 5.46 | 6.98 |

The results of IR, NMR and MS of the produced compound were as follows:

IR ($\nu max/cm^{-1}$):
3420,3075,1690,1600,1545,1225,790,730:

NMR ($\delta$/ppm) (in DMSO—d$_6$):
1.30(d,6H), 2.35(s,3H), 5.13(sep,1H), 6.90—7.40(m,4H),
7.80(m,2H), 8.20(m,2H), 8.30(s,1H), 9.00(s,2H), 11.40(s,1H)

MS(m/l): 414 (M+)

Figure 1:
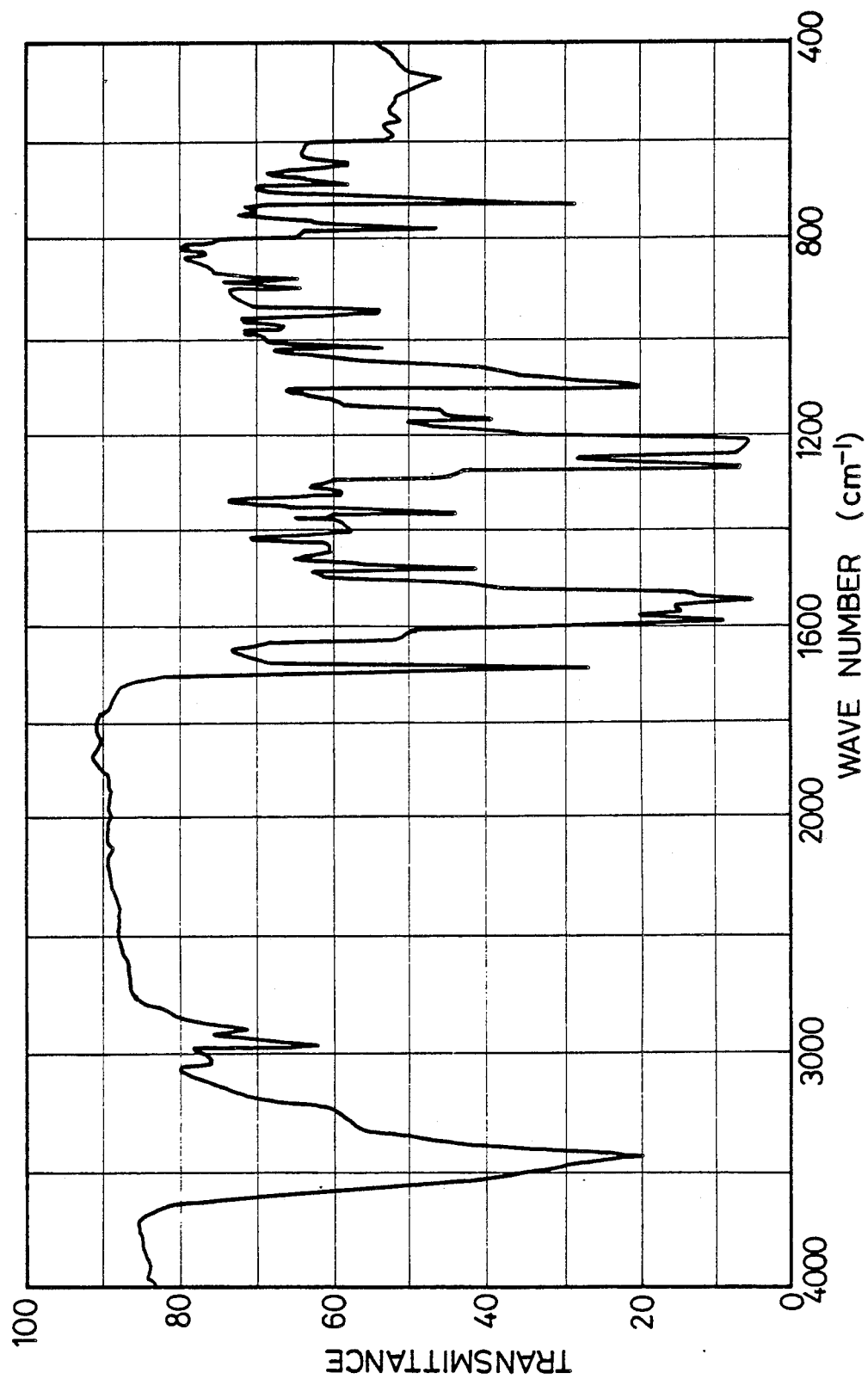
FIG. 1 is the infrared absorption spectrum of a compound of formula (I)

The infrared absorption spectrum of the produced compound is shown in FIG. 1.

EXAMPLE 2

A composition for sublimation transfer record, a transfer sheet, a material to be recorded were prepared using the compound synthesized in Example 1 by the following procedures. Afterward, transfer recording was carried out.

| (i) Preparation of composition for sublimation transfer record: | |
|---|---|
| Dyestuff of the formula (I) | 3 parts |
| Polybutyral resin | 4.5 parts |
| Methyl ethyl ketone | 46.25 parts |
| Toluene | 46.25 parts |

A dyestuff mixture having the above-mentioned composition was mixed with a paint conditioner for about 30 minutes using glass beads in order to prepare the desired composition.

(ii) Preparation of transfer sheet:

A polyethylene terephthalate film, which had a thickness of 9 μm and the back surface of which had been treated to impart heat resistance thereto, was coated with the above-mentioned composition for record by the use of a gravure calibrator (plate depth 30 μm) so that the coating amount of the composition would be 1.0 g/m² in terms of a dry state, and the film having the composition thereon was then dried.

| (iii) Preparation of material to be recorded: | |
|---|---|
| Polyester resin (trade name Vylon 103; made by Toyobo Co., Ltd.; Tg = 47° C.) | 0.8 part |
| EVA Polymeric plasticizer (trade name Erbaloy 741p; made by Mitsui Polychemical Co., Ltd.; Tg = −37° C.) | 0.2 part |
| Amino-modified silicone (trade name KF-857; made by The Shin-Etsu Chemical Co., Ltd.) | 0.04 part |
| Epoxy-modified silicone (trade name KF-103; made by The Shin-Etsu Chemical Co., Ltd.) | 0.04 part |
| Methyl ethyl ketone/ toluene/cyclohexane (weight ratio 4:4:2) | 9.0 parts |

These raw materials were mixed to form a coating solution, and a synthetic paper (trade name Yupo FPG#150; made by Oji Yuka Co., Ltd.) was coated with the formed coating solution by the use of a bar coater (RK Print Coat Instruments Co., Ltd.; No. 1) so that the amount of the coating solution would be 4.5 g/m² in terms of a dry state, and the coated paper was then dried at 100° C. for 15 minutes.

(iv) Transfer recording:

The transfer sheet was superimposed on the material to be recorded so that the composition on the transfer sheet might be confronted with the coating solution surface on the material to be recorded, and a thermosensitive head was actuated to the back surface of the thermotransfer sheet under conditions of voltage 10 V and printing time 4.0 millisecond, thereby obtaining a cyan color of color density 1.85.

The color density was calculated from the formula:
color density $= \log_{10}(I_0/I)$ $I_0$ = intensity of reflected light from a standard white reflective plate $I$ = intensity of reflected light from a test piece These parameters $I_0$ and $I$ were measured by a densitometer (model RD-514; filter of Wratten No. 58) made by U.S. Macbeth Co., Ltd.

For the obtained records, a light resistance test was made at a black panel temperature of 63±2° C. by the use of a xenon fade meter (made by Suga Testing Machine Co., Ltd.). It became apparent that the records were scarcely discolored by xenon lamp irradiation for 40 hours. The recorded images were also excellent in stability under conditions of high temperature and humidity.

Next, the fastness of the recorded images were evaluated. That is, the images were allowed to stand at 50° C. for 48 hours, and the surfaces of the images were then rubbed with a white paper. As a result, the sharpness of the images was not changed and the white paper was not colored, either, which meant that the recorded images were excellent in fastness.

COMPARATIVE EXAMPLES 1 to 6

Six compounds shown in Table 1 and represented by the formula (V)

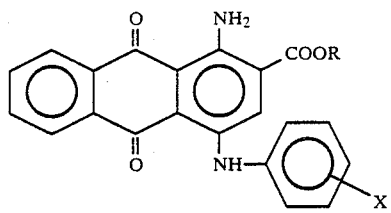

were used to prepare compositions for sublimation transfer record, transfer sheets and materials to be recorded in accordance with the procedure of Example 2. Furthermore, transfer recording was carried out by the use of these transfer sheets and materials to be recorded, and maximum transfer densities were measured and the results are set forth in Table 1. Incidentally, the maximum transfer density just mentioned can be defined as a maximum color density which is obtained by changing amounts of sublimation energy applied in a transfer process. An organic solvent which was used to compare solubility was a 1:1 mixed solvent of toluene and methyl ethyl ketone which were most prevalently used to prepare the composition for record.

The amounts of energy which was applied to the transfer sheet for sublimation at the time of transferring were sectioned into 16 steps, and the color density of the transfer record in each step was measured. The results are shown in FIG. 2.

TABLE 1

| | Substituents in Formula (V) | | Solubility in Organic Solvent | Maximum Transfer Density |
| --- | --- | --- | --- | --- |
| | R | X | | |
| Example 2 | iso-C$_3$H$_7$ | m-CH$_3$ | O | 1.85 |
| Comp. Example 1 | iso-C$_3$H$_7$ | p-CH$_3$ | W | 1.60 |
| Comp. Example 2 | iso-C$_3$H$_7$ | o-CH$_3$ | X | 1.40 |
| Comp. Example 3 | n-C$_4$H$_9$ | p-CH$_3$ | X | 1.35 |
| Comp. Example 4 | n-C$_4$H$_9$ | m-CH$_3$ | X | 1.40 |
| Comp. Example 5 | CH$_3$ | m-CH$_3$ | X | 1.10 |
| Comp. Example 6 | CH$_3$ | H | X | 1.05 |

The solubility in the organic solvent was ranked in accordance with microscope observation as follows:
O: Insoluble materials were not present.
W: Insoluble materials were slightly present.
X: Insoluble materials were perceptibly present.

EXAMPLE 3

A composition for color toner was prepared using the compound synthesized in Example 1.

That is, 5 parts of the compound represented by the formula (I) and 95 parts of a resin for toner (styrenea-crylate copolyer; trade name Hymer TB-1000F; made by Sanyo Chemicals Co., Ltd.) was mixed and ground in a ball mill. The mixture was then heated up to 150° C., and the melted mixture was further mixed therein. After cooling, the product was coarsely ground with a hammer mill, and afterward was finely ground with of a pulverizer in which an air jet system was employed. The resulting powder was classified, and particles having a diameter of 1 to 20 μm were selected as the desired composition for toner. Afterward, 40 parts of the thus prepared composition for toner was uniformly mixed with 1 part of tetraoctylammonium chloride and 900 parts of a carrier iron powder (trade name EFV 250/400; Nippon Teppun Co., Ltd.) in order to form a developing agent. Copying was performed using the thus formed developing agent by a dry type electrophotographic copier (trade name NP-5000; made by Canon Inc.) for ordinary papers. As a result, a fog-free sharp cyan color image was obtained. Moreover, the light resistance of the copy was good and was evaluated to be of the sixth grade.

COMPARATIVE EXAMPLE 7

The same procedure as in Example 3 was repeated with the exception that the compound represented by the formula (I) was replaced with 5.0 parts of an indophenolaniline compound represented by the formula (VI)

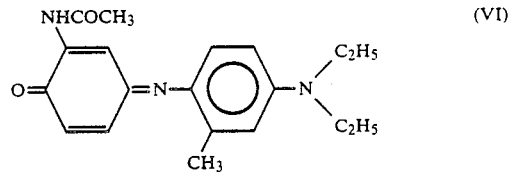

As a result, a greenish cyan color was obtained, but its light resistance was bad, i.e., third grade.

COMPARATIVE EXAMPLE 8

The same procedure as in Example 3 was repeated with the exception that the compound represented by the formula (I) was replaced with 5.0 parts of an 1-methylamino-4-(2-hydroxyethylaminio)anthraquinone represented by the formula (VII)

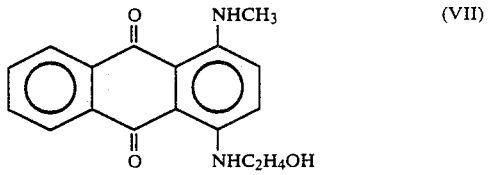

As a result, a greenish cyan color was obtained, but the miscibility of the compound of formula (VII) with the toner resin was poor. In addition, a fog phenomenon occurred, and the light resistance of the duplicate was poor, viz. third grade.

In Example 3 and Comparative Examples 7 and 8, light resistance was evaluated by irradiating the copy with a fade meter (carbon arc lamp) at 63° C. for 60 hours, and then comparing the state of the irradiated copy with a blue scale.

As is apparent from the examples and comparative examples, the dyestuff of the present invention comprising the compound represented by the formula (I) has good miscibility in an organic solvent and maximum transfer density.

In addition, as seen from FIG. 2, the dyestuff of the present invention has a higher transfer color density at a certain energy level than the other dyestuffs, which meant that the dyestuff of the present invention had a higher transfer sensitivity.

Moreover, the composition for color toner containing the dyestuff of the present invention is also excellent in transparency and is stable, and the images obtained therefrom are sharp and excellent in preservation stability and light resistance.

What is claimed is:

1. A sublimation transfer record or transfer record composition containing isopropyl 1-amino-4-m-toluidinoanthraquinone-2-carboxylate, a compound of the formula

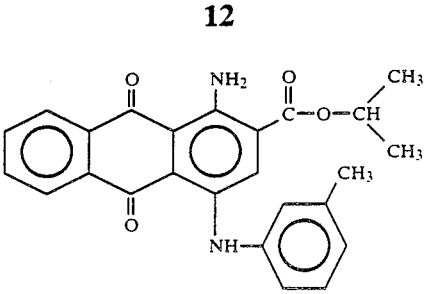

2. A cyan composition for sublimation transfer record according to claim 1.

3. A cyan composition for sublimation transfer record according to claim 1 containing about 1 to 50% by weight of said compound.

4. A cyan composition for color toner compound described in claim 1.

5. A cyan composition for color toner according to claim 1 containing about 0.1 to 10% by weight of said compound.

6. A composition according to claim 2, comprising an oily resin selected from the group consisting of rosins, phenol resin, xylene resin, petroleum resin, vinyl resin, polyamide resin, alkyd resin, nitrocelluloses and alkycelluloses, and aqueous resins such as maleic resin, acrylic resin, casein shellac, and glue.

7. A composition according to claim 2, containing 1-10% by weight of said compound dissolved in an organic solvent.

* * * * *